US012628070B2

(12) United States Patent

He et al.

(10) Patent No.: US 12,628,070 B2

(45) Date of Patent: May 12, 2026

(54) EXTENSION METHODS AND WIRELESS COMMUNICATION SYSTEM

(71) Applicant: Realtek Semiconductor Corp., Hsinchu (TW)

(72) Inventors: YiDong He, Suzhou City (CN); ZhaoMing Li, Suzhou City (CN); ZuoHui Peng, Suzhou City (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 161 days.

(21) Appl. No.: 18/338,484

(22) Filed: Jun. 21, 2023

(65) Prior Publication Data

US 2024/0031920 A1 Jan. 25, 2024

(30) Foreign Application Priority Data

Jul. 25, 2022 (CN) .......................... 202210878706.2

(51) Int. Cl.
*H04W 48/12* (2009.01)
*H04W 84/12* (2009.01)

(52) U.S. Cl.
CPC ............ *H04W 48/12* (2013.01); *H04W 84/12* (2013.01)

(58) Field of Classification Search
CPC . H04W 48/12; H04W 84/12; H04W 52/0229; Y02D 30/70
See application file for complete search history.

(56) References Cited

U.S. PATENT DOCUMENTS

| | | | | |
|---|---|---|---|---|
| 2018/0115950 A1* | 4/2018 | Asterjadhi | ............ | H04W 76/28 |
| 2018/0295221 A1* | 10/2018 | Yu | ........................... | H04W 72/23 |
| 2023/0309069 A1* | 9/2023 | Zhang | ............... | H04W 72/0446 |

(Continued)

FOREIGN PATENT DOCUMENTS

| | | | | |
|---|---|---|---|---|
| CN | 106879070 A | 6/2017 | | |
| CN | 108123781 A | * 6/2018 | ........... | H04L 1/1671 |

(Continued)

OTHER PUBLICATIONS

Machine Translation of CN 201611072323 A (Year: 2016).*
Machine Translation of CN 108123781 A (Year: 2016).*
Machine Translation of CN 112867106 A (Year: 2019).*

*Primary Examiner* — Hashim S Bhatti
*Assistant Examiner* — Noah James Sugden
(74) *Attorney, Agent, or Firm* — McClure, Qualey & Rodack, LLP

(57) ABSTRACT

The present disclosure provides an extension method, applied in a wireless communication system, the wireless communication system comprises a wireless access point and a plurality of stations, to which the wireless access point is connected, wherein the following steps are performed by the wireless communication system:
the wireless access point generating a trigger frame according to a self-defined user information;
the wireless access point broadcasting the trigger frame to the plurality of stations through a wireless channel;
the plurality of stations receiving the trigger frame and then sending an information frame to the wireless access point;
wherein, the self-defined user information comprises a default state command, by which existing in the self-defined user information, there would be not necessary (Continued)

to wait for subsequent information frames for time saving and energy conserving.

13 Claims, 12 Drawing Sheets

(56)                    References Cited

U.S. PATENT DOCUMENTS

2023/0345300 A1* 10/2023 Haider ............. H04W 28/0268
2024/0284254 A1*  8/2024 Iwai ..................... H04W 72/23
2024/0324030 A1*  9/2024 Chitrakar .......... H04W 74/0833

FOREIGN PATENT DOCUMENTS

CN       109495926 A       3/2019
CN       112867106 A  *    5/2021   ........ H04W 52/0235
JP       2013102349 A       5/2013

* cited by examiner

S11 — The wireless access point inserting the self-defined user information into the trigger frame

The wireless access point obtaining a user information field of the trigger frame The wireless access point inserting the self-defined user information to be adjacent to the user information field S111b S112b The wireless access point obtaining a reserved code in the association identifier S113b The wireless access point configuring the self-defined user information according to the reserved code

S11

S110c

The wireless access point obtaining a padding information field of the trigger frame S110c

S70

The wireless access point inserting the self-defined user information into the padding information field

S80

S110c

The wireless access point inserting the self-defined user information to be adjacent to the padding information field

S90

S110c

The wireless access point replacing the padding information field with the self-defined user information

S11

S110d — The wireless access point obtaining a bitmap control and a partial virtual bitmap S111d — The wireless access point configuring the corresponding self-defined user information for the bitmap control and the partial virtual bitmap

EXTENSION METHODS AND WIRELESS COMMUNICATION SYSTEM

CROSS-REFERENCE TO RELATED APPLICATION

This application claims the priority benefit of Chinese Patent Application Serial Number 202210878706.2, filed on Jul. 25, 2022, the full disclosure of which is incorporated herein by reference.

BACKGROUND

Technical Field

The present disclosure relates to the technical field of communications, particularly to an extension method and a wireless communication system.

Related Art

In the conventional developed wireless communication technology, which is applied in the environment of Wi-Fi 6, mainly comprises a wireless access point (AP) and a plurality of stations that performs transmission through the protocol between the wireless access point and the stations to construct a high-density wireless channel application environment. When a multi-user (MU) individually uploads frames to be sent to the wireless access point through the stations, in order to allow the wireless access point to simultaneously receive frames individually uploaded by each of the stations, the wireless access point would first send a trigger frame to each of the stations to notify that the frame can be uploaded to the wireless access point for reducing the transmission time delay and improving the transmission efficiency of a wireless channel between the wireless access point and the stations.

Regarding the technology of a target wake time (TWT) of a conventional wireless channel, the transmission efficiency of the wireless channel between the wireless access point and the stations can be improved through a timestamp method. Specifically, the wireless access point could broadcast a beacon frame that comprises timestamp information. The stations could receive the beacon frame from the wireless access point and could perform a time synchronization procedure according to the timestamp information in the beacon frame to synchronize the time of the wireless access point with the time of the stations.

However, since the beacon frame is sent to the stations by broadcasting that, in a complex environment, the transmission of the beacon frame would be affected so that the stations could not receive the beacon frame. So, the stations could not synchronize with the wireless access point, resulting in the risk of frame missing.

Another conventional wireless channel technology is that the wireless access point puts a buffer status report information in a traffic indication message (TIM) in the beacon frame or in an end of service period (EOSP) information in a quality of service (QoS) frame for further configuring by buffer status report (BSR). So, the wireless access point could notify that there would be no frames to be transmitted to the stations, and the stations could enter sleep state to reduce power consumption.

Besides, when applying the mode of next target wake time (Next TWT), which mainly puts a next target wake time information in an action frame, the wireless access point could inform the stations about the time period of the next target wake time through the next target wake time information of the action frame.

However, by the BSR or Next TWT, the stations must wait to receive the traffic indication message, the end of service period information, or the next target wake time information before entering sleep mode. It would be quite time-consuming if all wake periods are required to wait to receive the traffic indication information or the end of service period information.

Therefore, a further improvement for the technology of prior arts is essential.

SUMMARY

The embodiments of the present disclosure provide an extension method for trigger frames to save time and conserve power by inserting a self-defined user information into the trigger frame.

For achieving the purpose above, the main technical solution for the present disclosure is to apply the expansion method for trigger frames to a wireless communication system, the wireless communication system comprises a wireless access point and a plurality of stations, to which the wireless access point is connected, wherein the following steps are performed by the wireless communication system:

the wireless access point generating the trigger frame according to a self-defined user information;

the wireless access point broadcasting the trigger frame to the plurality of stations through a wireless channel;

the plurality of stations receiving the trigger frame and then sending an information frame;

the wireless access point receiving the information frames from the plurality of stations; and wherein the self-defined user information comprises a default state command.

Preferably, the step of "the wireless access point generating the trigger frame according to a self-defined user information" further comprises the following sub-step: the wireless access point inserting the self-defined user information into the trigger frame.

Preferably, the step of "the wireless access point inserting the self-defined user information into the trigger frame" further comprises the following sub-step:

the wireless access point obtaining a user information field of the trigger frame; and the wireless access point inserting the self-defined user information to be adjacent to the user information field.

Preferably, the step of "the wireless access point inserting the self-defined user information into the trigger frame" further comprises the following sub-step:

the wireless access point obtaining an association identifier in the user information field; and the wireless access point configuring the self-defined user information for the association identifier.

Preferably, the step of "the wireless access point configuring the self-defined user information for the association identifier" further comprises the following sub-step:

the wireless access point obtaining a reserved code in the association identifier; and the wireless access point configuring the self-defined user information according to the reserved code.

Preferably, the step of "the wireless access point inserting the self-defined user information into the trigger frame" further comprises the following sub-step:

the wireless access point obtaining a padding information field of the trigger frame.

Preferably, after the step of "the wireless access point obtaining a padding information field of the trigger frame", then the following step is performed:

the wireless access point inserting the self-defined user information into the padding information field.

Preferably, after the step of "the wireless access point obtaining a padding information field of the trigger frame", then the following step is performed:

the wireless access point inserting the self-defined user information to be adjacent to the padding information field.

Preferably, after the step of "the wireless access point obtaining a padding information field of the trigger frame", then the following step is performed:

the wireless access point replaces the padding information field with the self-defined user information.

Preferably, the step of "the wireless access point inserting the self-defined user information into the trigger frame" further comprises the following sub-step:

the wireless access point obtaining a bitmap control and a partial virtual bitmap; and the wireless access point configuring the corresponding self-defined user information for the bitmap control and the partial virtual bitmap.

Preferably, the default state command comprises a next action information, a timestamp information, a buffer state report information, or a next target wake time information.

Preferably, the extension method for trigger frames further comprises a station, and after the step of "the wireless access point broadcasting the trigger frame to the plurality of stations through the wireless channel", the plurality of stations perform the following steps:

the plurality of stations obtaining the self-defined user information; and the plurality of stations correspondingly executing an action program according to the default state command of the self-defined user information.

According to the above method, after the plurality of stations receive the self-defined user information by inserting the self-defined user information into the trigger frame, the corresponding action program can be executed according to the default state command of the self-defined user information. Thus, the plurality of stations do not need to wait for subsequent information frames which save time and conserve power.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 2 is a flow chart of an embodiment of the present disclosure;

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

The expansion method for trigger frames of the present disclosure is applied in a wireless communication system. The wireless communication system comprises a wireless access point (AP) 10 and a plurality of stations 20. The wireless access point 10 comprises a media access control layer (MAC), which establishes a communication channel with the plurality of stations and communicates with the plurality of stations 20 through the communication channel by a frame trigger mechanism. In this embodiment, the wireless communication system is applied in the Institute of Electrical and Electronics Engineers (IEEE) 802.11ax communication technology.

Figure 1:
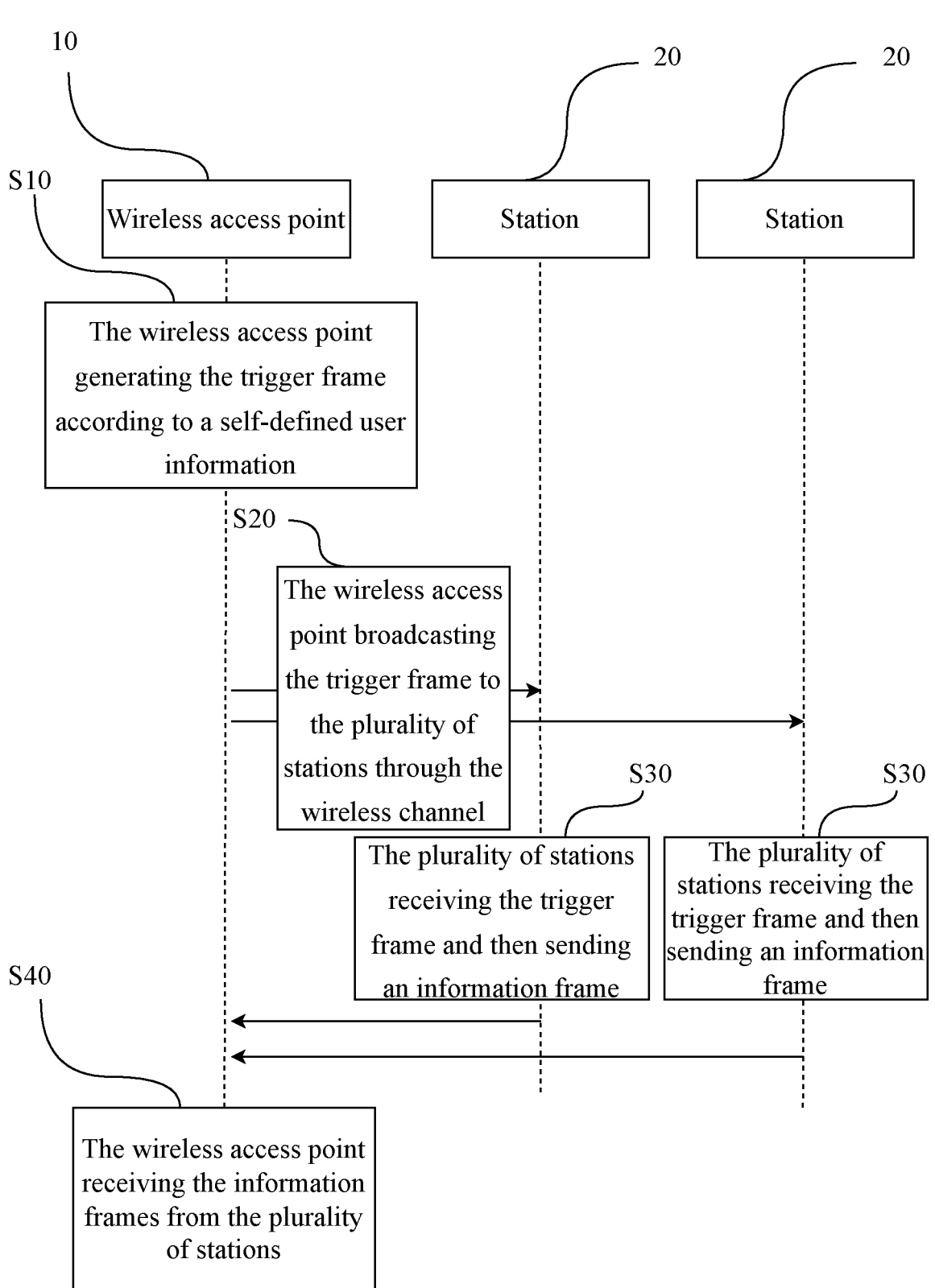
FIG. 1 is a block diagram of an embodiment of the present disclosure.

Regarding embodiments of the expansion method for trigger frames of the present application, as shown in FIG. 1, the method is performed by the wireless communication system in following steps:

the wireless access point generating the trigger frame according to a self-defined user information (S10);

the wireless access point broadcasting the trigger frame to the plurality of stations through a wireless channel (S20);

the plurality of stations receiving the trigger frame and then sending an information frame (S30);

the wireless access point receiving the information frames from the plurality of stations (S40).

In this embodiment, the self-defined user information comprises a default state command.

Specifically, after establishing the communication channel with the plurality of stations 20 through the wireless channel, the wireless access point 10 broadcasts the trigger frames to the plurality of stations 20 in a transmission interval through the communication channel. When the plurality of stations 20 receive the trigger frames, the plurality of stations 20 would send an information frame to the wireless access point 10 through the communication channel according to the trigger frames. Meanwhile, the plurality of stations 20 enable the plurality of stations 20 to perform an action program correspondingly according to the default state command in the self-defined user information of the trigger frame. So, the stations 20 do not need to wait for the wireless access point to receive the next information frame, which saves time and conserves power.

Figure 2:
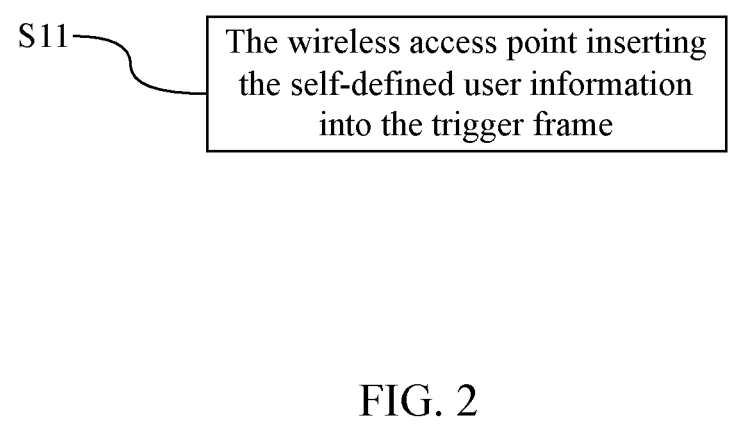

In this embodiment, as shown in FIG. 2, the step of "the wireless access point generating the trigger frame according to a self-defined user information (S10)" further comprises the following sub-step:

the wireless access point inserting the self-defined user information into the trigger frame (S11).

Figure 3:
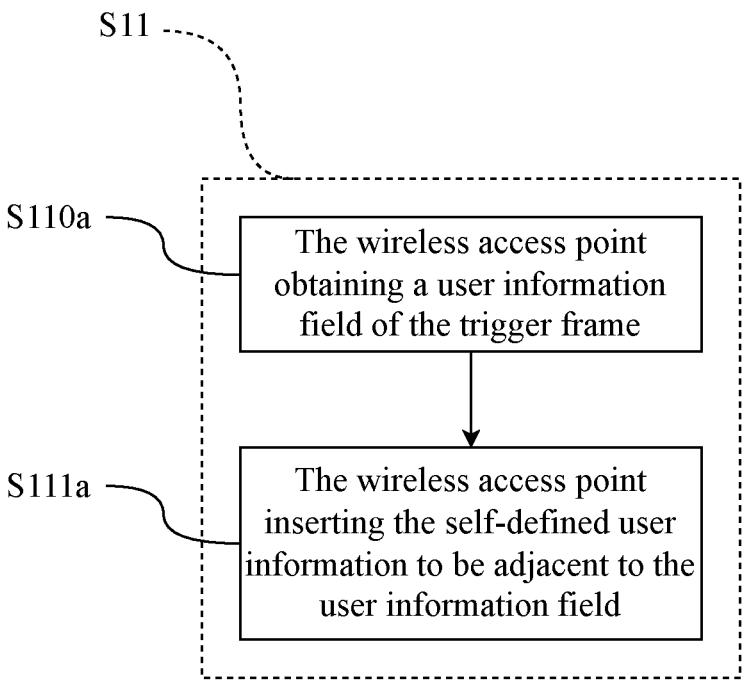
FIG. 3 is another flow chart of an embodiment of the present disclosure.

In this embodiment, as shown in FIG. 3, the step of "the wireless access point inserting the self-defined user information into the trigger frame (S11)" further comprises the following sub-step:

the wireless access point obtaining a user information field of the trigger frame (S110a);

the wireless access point inserting the self-defined user information to be adjacent to the user information field (S111a).

In this embodiment, the self-defined user information is inserted before the user information field or after the user information field.

Figure 4:
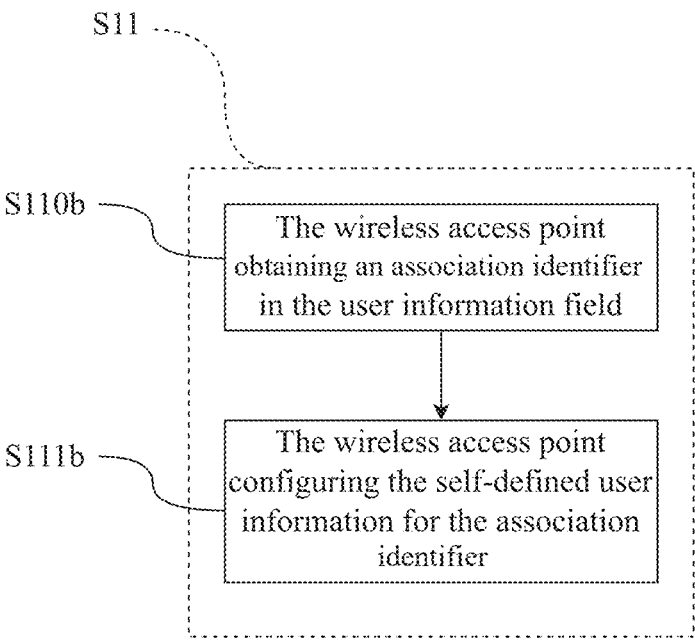
FIG. 4 is another flow chart of an embodiment of the present disclosure.

In this embodiment, as shown in FIG. 4, the step of "the wireless access point inserting the self-defined user information into the trigger frame (S11)" further comprises the following sub-step:

the wireless access point obtaining an association identifier in the user information field (S110b);

the wireless access point configuring the self-defined user information for the association identifier (S111b).

In this embodiment, the association identifier could be configured to correspond to one self-defined user information, or could correspond to a plurality of self-defined user information at a time.

Figure 5:
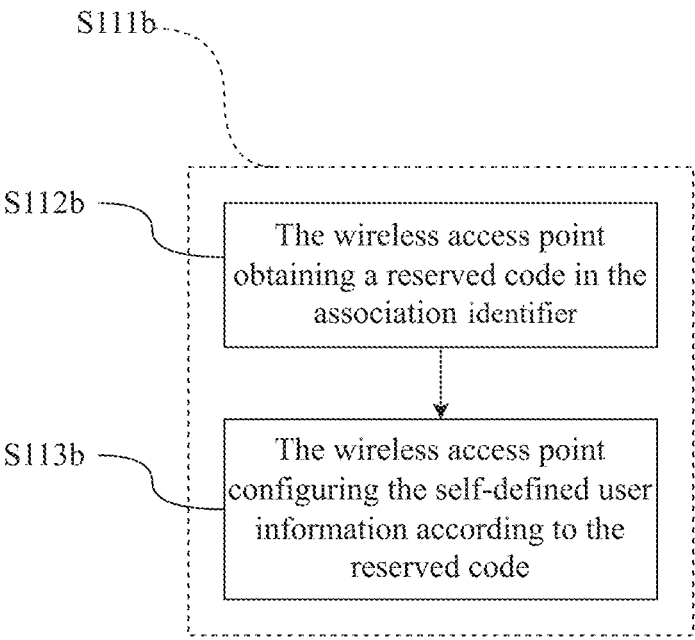
FIG. 5 is another flow chart of an embodiment of the present disclosure.

In this embodiment, as shown in FIG. 5, the step of "the wireless access point configuring the self-defined user information for the association identifier (S111b)" further comprises the following sub-step:

the wireless access point obtaining a reserved code in the association identifier (S112b);

the wireless access point configuring the self-defined user information according to the reserved code (S113b).

Figure 6:
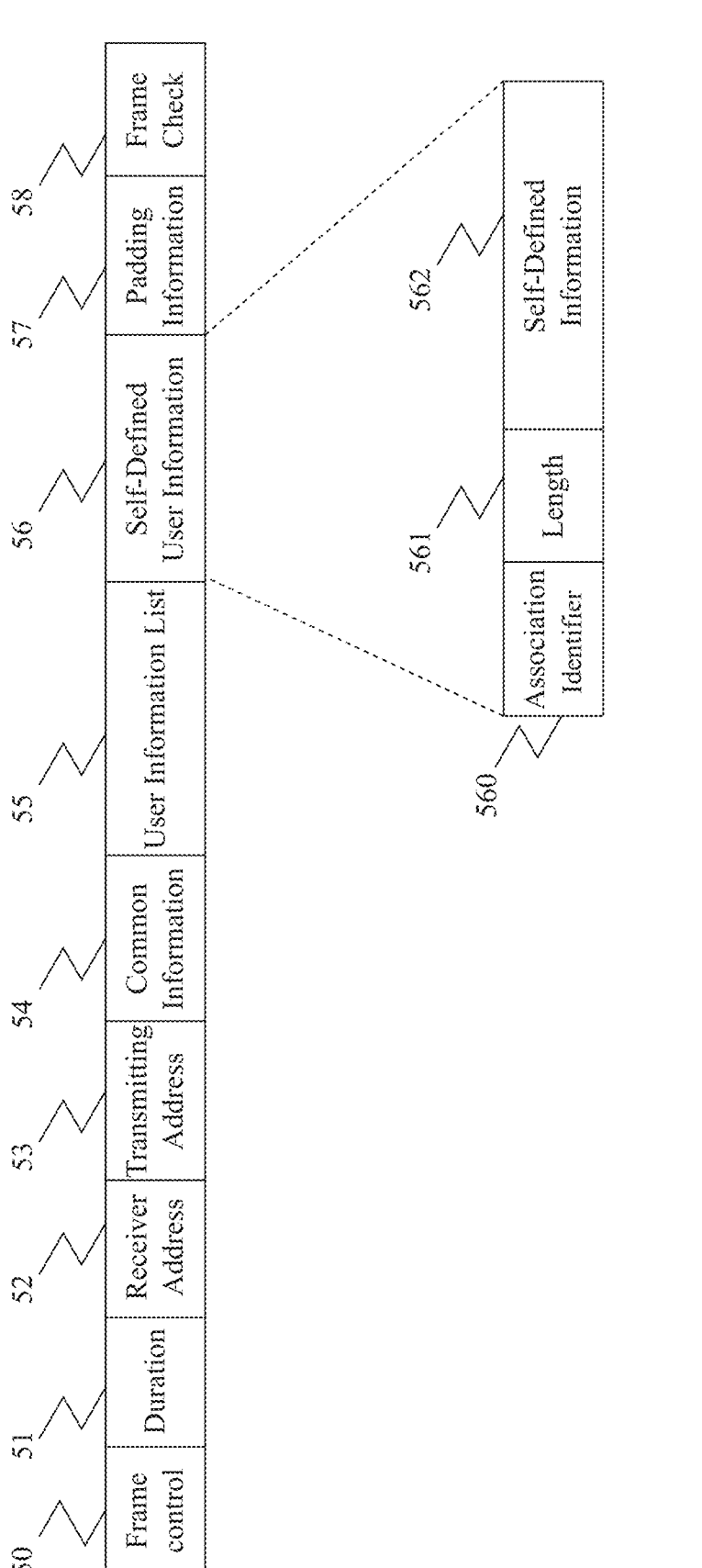
FIG. 6 is a schematic diagram of a trigger frame of an embodiment of the present disclosure.

Specifically, as shown in FIG. 6, the fields of the trigger frame comprise a frame control field 50, a duration field 51, a receiver address (RA) field 52, a transmitter address (TA) field 53, a common information field 54, a user information list field 55, the self-defined user information 56, a padding information field 57, and a frame check sequence (FCS) 58. The fields of the self-defined user information comprise an association identifier (AID) 560, a length field (Length) 561, and a self-defined information 562.

Each integer value of the association identifier 560 in codes 2047 to 4094 is a reserved code, which is not used in the existing wireless communication technology. So, by using the reserved code as the association identifier 560, the length field 561 represents the length of the self-defined information 562, and corresponding the association identifier 560 to the self-defined information 562 for obtaining the self-defined user information 56.

For example, based on the fact that the code 2047 is an unused reserved code, the association identifier 560 can be replaced by 2047 (i.e., AID=2047), the self-defined information 562 is the Timestamp, and the self-defined user information 56 is obtained. When the AP transmits the self-defined user information 56 to the STA in the transmission interval, and after the STA's receiving, it will judge that the received self-defined information 562 is a Timestamp according to AID=2047. Then, the STA would perform time synchronization to receive the next information on time.

For another example, if the AP configures the AID of the self-defined user information 56 to be 2048, the corresponding self-defined information 562 is Next TWT. Alternatively, the AP could configure the AID of the self-defined user information 56 to be 2049, the corresponding self-defined information 562 is Buffer Status. When the STA receives that AID=2048, it would perform the next action according to the Next TWT, and when the STA receives that AID=2049, it would perform the next action according to the Buffer Status.

In this embodiment, if there is an agreement between the AP and the STA for the length of the self-defined information 562, the length field 561 may not be individually configured. The information length of the Timestamp is 8 bytes, the information length of the Next TWT is 4, 6, or 8 bytes, and the information length of the Buffer Status is 4 bytes.

Figure 7:
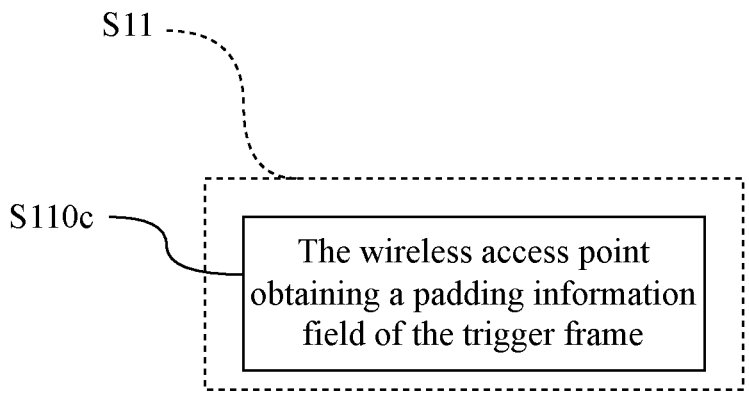
FIG. 7 is another flow chart of an embodiment of the present disclosure.

In this embodiment, as shown in FIG. 7, the step of "the wireless access point inserting the self-defined user information into the trigger frame (S11)" further comprises the following sub-step:

obtaining a padding information field of the trigger frame (S110c).

Figure 8:
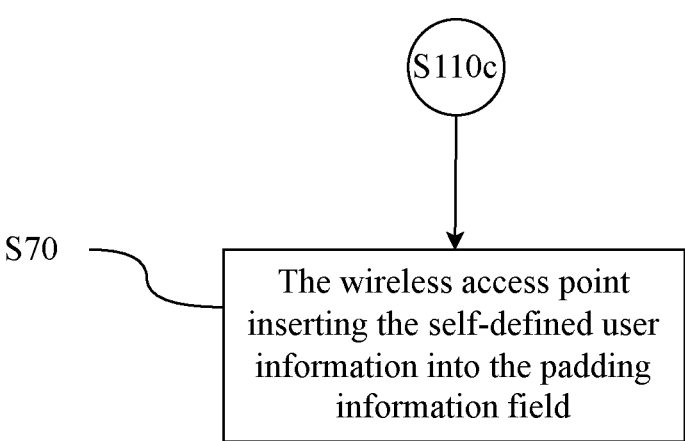
FIG. 8 is another flow chart of an embodiment of the present disclosure.

In this embodiment, as shown in FIG. 8, the step of "the wireless access point obtaining a padding information field of the trigger frame (S110*c*)" further comprises the following sub-step:

inserting the self-defined user information into the padding information field (S70).

Figure 9:
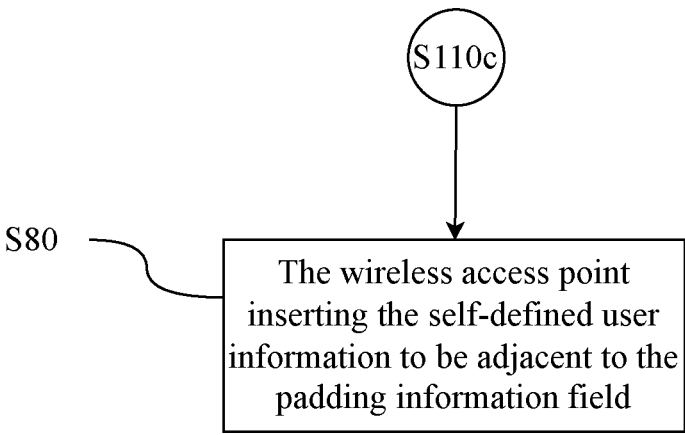
FIG. 9 is another flow chart of an embodiment of the present disclosure.

In this embodiment, as shown in FIG. 9, after the step of "the wireless access point obtaining a padding information field of the trigger frame (S110*c*)", then the following step is performed:

the wireless access point inserting the self-defined user information to be adjacent to the padding information field (S80).

In this embodiment, the self-defined user information is inserted before the padding information field or after the padding information field.

Figure 10:
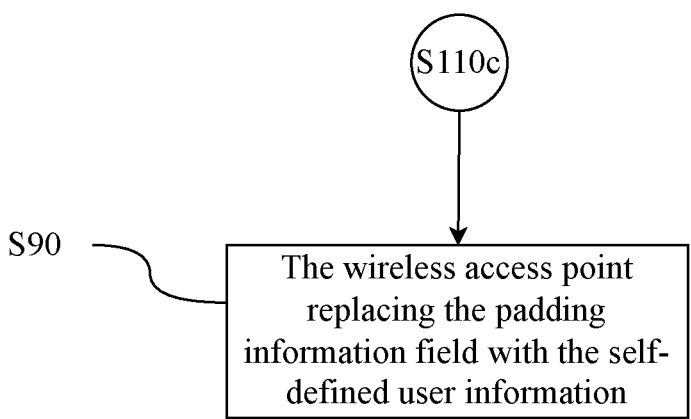
FIG. 10 is another flow chart of an embodiment of the present disclosure.

In this embodiment, as shown in FIG. 10, after the step of "the wireless access point obtaining a padding information field of the trigger frame (S110*c*)", then the following step is performed:

replacing the padding information field with the self-defined user information (S90).

Figure 11A:
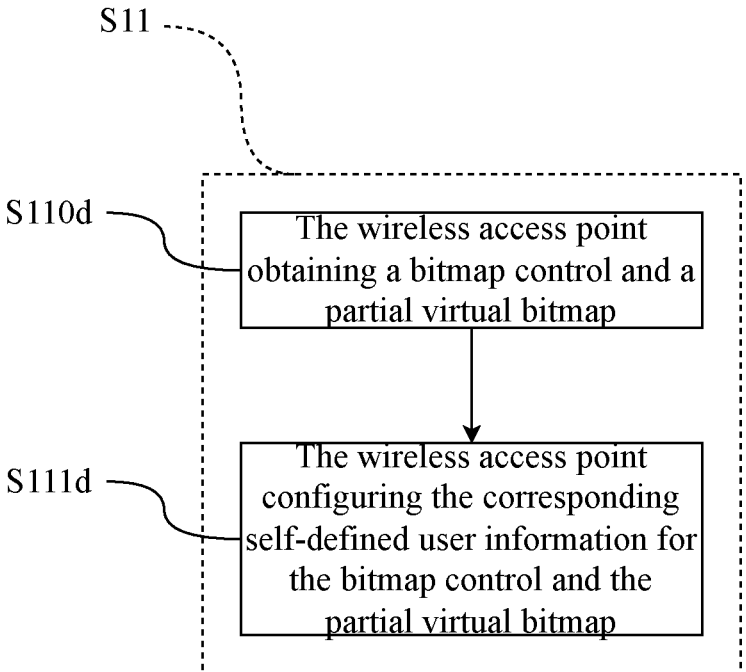
FIG. 11A is another flow chart of an embodiment of the present disclosure.

In this embodiment, as shown in FIG. 11A, the step of "the wireless access point inserting the self-defined user information into the trigger frame (S11)" further comprises the following sub-step:

obtaining a bitmap control and a partial virtual bitmap (S110*d*);

configuring the corresponding self-defined user information for the bitmap control and the partial virtual bitmap (S111*d*).

In this embodiment, the bitmap control is 1 byte, and the partial virtual bitmap is 3 bytes.

Figure 11B:
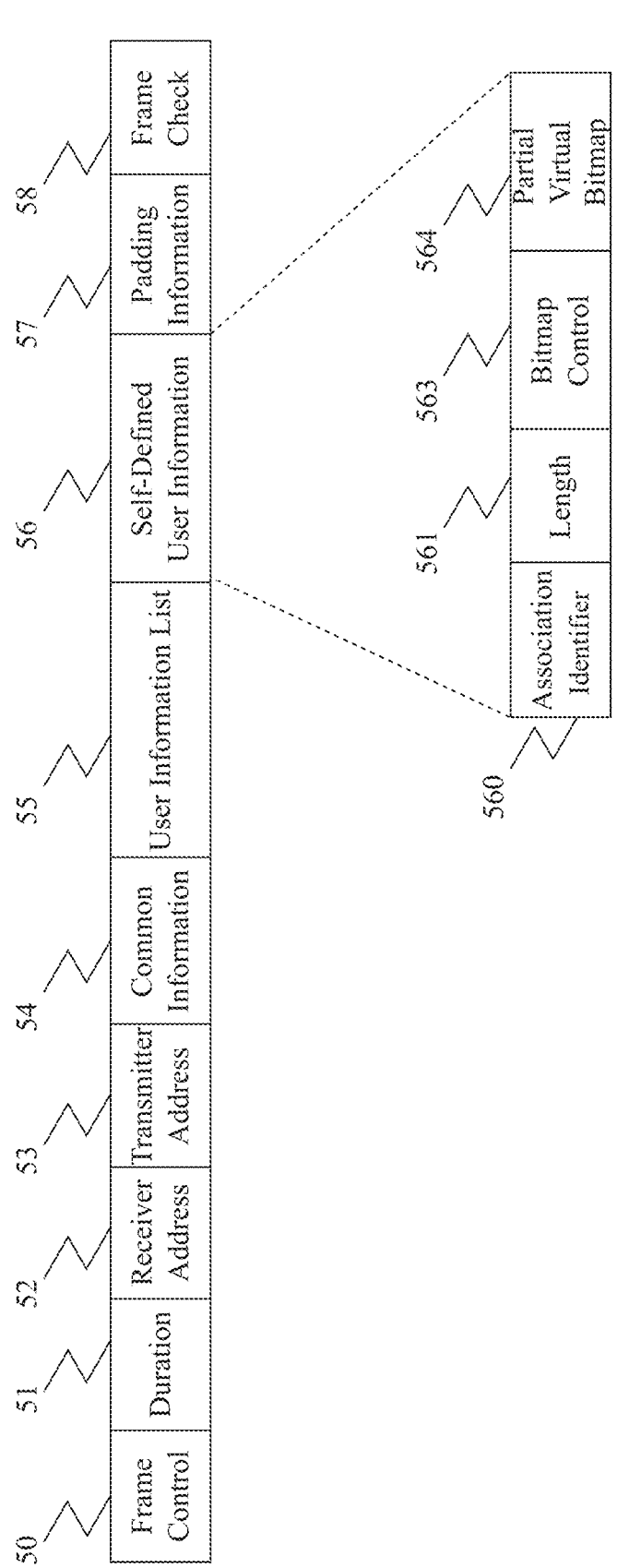
FIG. 11B is a schematic diagram of a trigger frame of an embodiment of the present disclosure.

For example, as shown in FIG. 11B, in this embodiment, it is applied to the Buffer Status. So, a corresponding buffer status report information to the bitmap control 563 and the partial virtual bitmap 564 of the self-defined user information 56 can be configured, and the self-defined user information in this embodiment is inserted before the padding information field.

Figure 12:
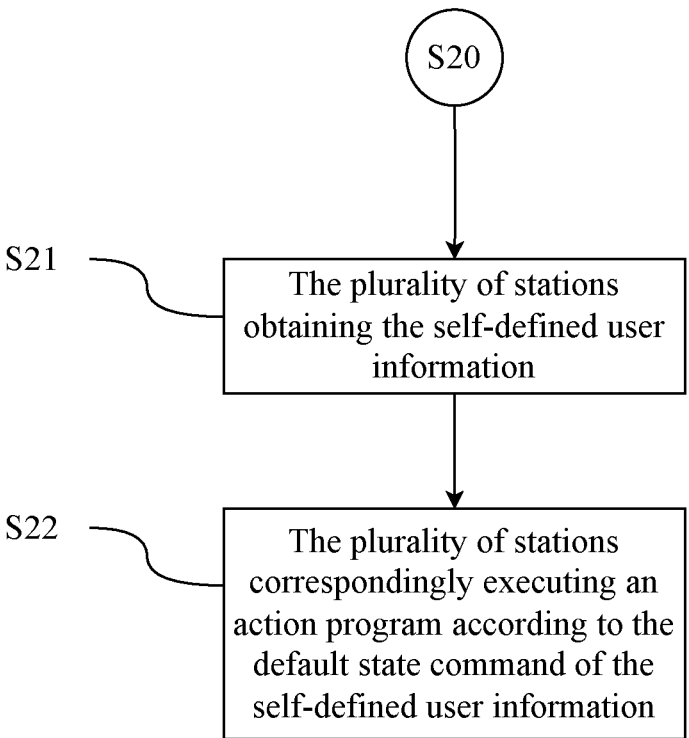
FIG. 12 is another flow chart of an embodiment of the present disclosure.

In this embodiment, as shown in FIG. 12, the extension method for trigger frames further comprises a station, and after the step of "the wireless access point broadcasting the trigger frame to the plurality of stations through the wireless channel (S20)", the plurality of stations perform the following steps:

the plurality of stations obtaining the self-defined user information (S21); and the plurality of stations correspondingly executing an action program according to the default state command of the self-defined user information (S22).

In the above embodiments, the default state command comprises a next action information, a timestamp information, a buffer state report information, or the next target wake time information. The next action information is an action information other than the timestamp information, the buffer status report information, or the next target wake time information.

If the default state command received by the STA is the timestamp information, that is, in the manner of Timestamp, the next action procedure of the STA is to perform time synchronization according to the timestamp information. If the next action information received by the STA is the buffer status report information, that is, in the form of Buffer Status, the next action procedure of the STA is to judge whether there is a frame buffered to the STA. If not, after sending the information of the STA from itself, it can enter the sleep ST. If the next action information received by the STA is the next target wake time information, that is, in the manner of Next TWT, the next action procedure of the STA is to obtain the next target wake time. If the default state command received by the STA is the next action information, a corresponding manner is adopted according to the preset next action information is just an example but not a limitation to this approach.

Figure 13:
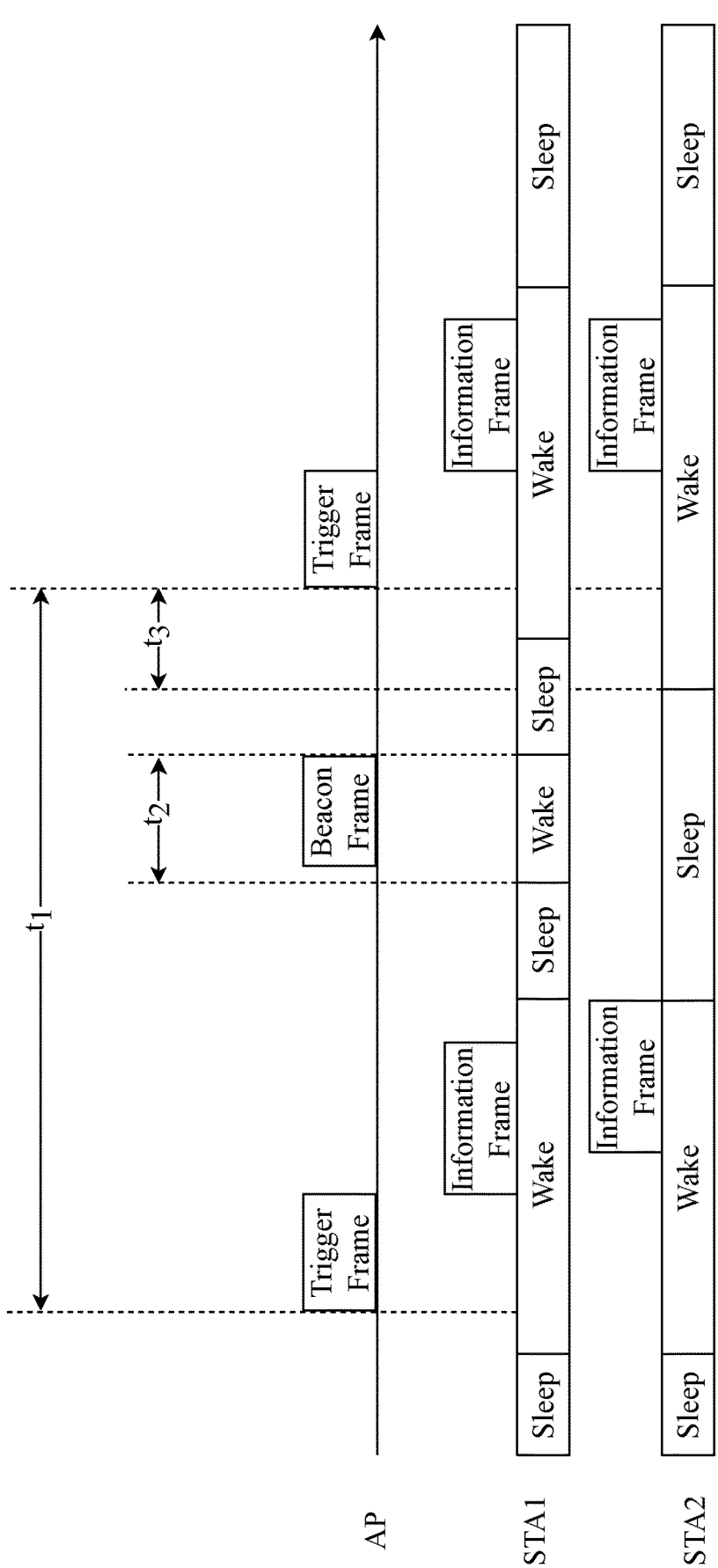
FIG. 13 is a schematic diagram of an example of a transmission interval of Beacon.

Compared with the prior arts, the present disclosure takes timestamp as an example, as shown in FIG. 13, STA1 is a method for trigger frames in the prior art, and STA2 is the method for trigger frames in the present disclosure. The transmission interval of the STA1 comprises a sleep interval and awake interval. STA1 and STA2 would not receive and transmit information in the sleep interval but can receive and transmit information in the awake interval. In the prior arts, STA1 would be woken up at time $t_2$ to receive a beacon with a large amount of information at time $t_1$. STA1 performs time synchronization with the AP according to the Beacon to receive the next Trigger frame. The STA2 of the present disclosure comprises the self-defined user information in the Trigger frame received, that is, the time of the STA2 and the AP is synchronized. STA2 would wake at time $t_3$ in advance to avoid missing frames to wait for the next Trigger frame. Due to the large amount of Beacon information, $t_2$ would take a long time that causing STA1 to consume more power when receiving the notification of the next Trigger frame. The STA2 of the present disclosure is the Trigger frame, which would cause STA2 to wake early at $t_3$ to avoid missing frames (based on a timing synchronization function (TSF) clock error between AP and STA). However, the wake time at $t_3$ is only to avoid early wake-up without receiving the next Trigger frame, so the wake time of $t_3$ does not need to be in the wake-up status for a long time according to the time required to receive frames. In this way, the STA2 of the present application can save more power than the STA1.

For example, under the regulation of 802.11, the error requirement of the timing synchronization function (TSF) clock of the AP and the STA is less than 100 ppm. So, when the 802.11 regulation is satisfied, the maximum clock error between AP and STA is 200 ppm, that is, the maximum error is 200 us per second. In the Beacon technology, it is generally sent at the lowest rate, i.e., 1 Mbps, and the length is assumed to be 200 bytes, i.e., 1600 bits, and the time that the STA needs to wake up in advance is not considered, the minimum value of $t_2$ is 1600 us, and $t_3 = 200 * t1$ (us). If $t_3 < t_2$, i.e., $200 * t1 < 1600$, then $t1 < 8$ s, which means that $t_1$ only needs 8 s to achieve the transmission. Thus, the STA2 of the present disclosure can also save transmission time.

In summary, embodiments of the present disclosure provide an extension method for trigger frames. After the plurality of stations receive the self-defined user information by inserting the self-defined user information into the trigger frame, the corresponding action program can be executed according to the default state command of the self-defined user information. Thus, the plurality of stations do not need to wait for subsequent information frames which save time and conserve power.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An extension method, applied in a wireless communication system, the wireless communication system comprising a wireless access point and at least one of station, to which the wireless access point being connected, the extension method comprising:

generating, by the wireless access point, a trigger frame according to a self-defined user information;

broadcasting, by the wireless access point, the trigger frame to the at least one of station through a wireless channel;

sending, by the at least one of station, an information frame after the trigger frame is received by the at least one of station; and receiving, by the wireless access point, the information frame from the at least one of station;

wherein the self-defined user information comprises a default state command for executing a corresponding action program by the at least one of station, wherein the default state command comprises one of: a next action information, a timestamp information, a buffer state report information, or a next target wake time information;

wherein the step of the wireless access point inserting the self-defined user information into the trigger frame further comprises the following sub-steps:

the wireless access point obtaining an association identifier in the user information field; and the wireless access point configuring the self-defined user information for the association identifier;

wherein the step of the wireless access point configuring the self-defined user information for the association identifier further comprises the following sub-steps:

the wireless access point obtaining a reserved code in the association identifier; and the wireless access point configuring the self-defined user information according to the reserved code wherein the reserved code is an integer code not otherwise used in the in the wireless communication, wherein the step of generating, by the wireless access point, a trigger frame according to a self-defined user information further comprises the following sub-step:

the wireless access point inserting the self-defined user information into the trigger frame.

2. The extension method according to claim 1, wherein the step of the wireless access point inserting the self-defined user information into the trigger frame further comprises the following sub-step:

the wireless access point obtaining a user information field of the trigger frame; and the wireless access point inserting the self-defined user information to be adjacent to the user information field.

3. The extension method according to claim 1, wherein the step of the wireless access point inserting the self-defined user information into the trigger frame further comprises the following sub-step:

the wireless access point obtaining a padding information field of the trigger frame.

4. The extension method according to claim 3, wherein after the step of the wireless access point obtaining a padding information field of the trigger frame, then the following step is performed:

the wireless access point inserting the self-defined user information into the padding information field.

5. The extension method according to claim 3, wherein after the step of the wireless access point obtaining a padding information field of the trigger frame, then the following step is performed:

the wireless access point inserting the self-defined user information to be adjacent to the padding information field.

6. The extension method according to claim 3, wherein after the step of the wireless access point obtaining a padding information field of the trigger frame, then the following step is performed:

the wireless access point replacing the padding information field with the self-defined user information.

7. The extension method according to claim 1, wherein the step of the wireless access point inserting the self-defined user information into the trigger frame further comprises the following sub-steps:

the wireless access point obtaining a bitmap control and a partial virtual bitmap; and the wireless access point configuring the corresponding self-defined user information for the bitmap control and the partial virtual bitmap.

8. The extension method according to claim 1, wherein the extension method further comprises a station, and after the step of broadcasting, by the wireless access point, the trigger frame to the plurality of stations through a wireless channel, the at least one of station perform the following steps:

the at least one of station obtaining the self-defined user information; and the at least one of station correspondingly executing an action program according to the default state command of the self-defined user information.

9. A wireless communication system, the wireless communication system comprising a wireless access point and at least one of station, to which the wireless access point being connected, the wireless communication system comprising:

the wireless access point configured to expand a trigger frame according to a self-defined user information, broadcast a trigger frame via a wireless channel, and receive at least one of information frame via the wireless channel; and the at least one of station configured to receive the trigger frame via the wireless channel and transmit the at least one of information frame after expanded trigger frame is successfully received;

wherein the self-defined user information comprises a default state command for executing a corresponding action program by the at least one of station, wherein the default state command comprises one of: a next action information, a timestamp information, a buffer state report information, or a next target wake time information;

wherein the wireless access point configures to obtain an association identifier in the user information field, and the wireless access point configures to configure the self-defined user information for the association identifier;

wherein the wireless access point configures to obtain a reserved code in the association identifier, and the wireless access point configures the self-defined user information according to the reserved code;

wherein the reserved code is an integer code not otherwise used in the in the wireless communication, wherein the wireless access point configures to insert the self-defined user information into the trigger frame to generate an extended trigger frame.

10. The wireless communication system according to claim 9, wherein the wireless access point inserts the self-defined user information to be adjacent to a user information field of the trigger frame.

11. The wireless communication system according to claim 9, wherein the wireless access point obtains a padding information field of the trigger frame, and the wireless access point inserts the self-defined user information into or adjacent to the padding information field.

12. The wireless communication system according to claim 9, wherein the wireless access point obtains a bitmap control and a partial virtual bitmap, and the wireless access point configures the corresponding self-defined user information for the bitmap control and the partial virtual bitmap.

13. The wireless communication system according to claim 9, wherein the wireless communication system is applied in the Institute of Electrical and Electronics Engineers (IEEE) 802.11ax communication technology.

\* \* \* \* \*